UNITED STATES PATENT OFFICE.

JOSEPH PEARSON GILL, OF NEW YORK, N. Y.

PROCESS OF REDUCING ORES.

SPECIFICATION forming part of Letters Patent No. 284,126, dated August 28, 1883.

Application filed July 31, 1883. (Specimens.)

*To all whom it may concern:*

Be it known that I, JOSEPH PEARSON GILL, of the city of New York, in the county of New York and State of New York, have invented a new and useful Improvement in the Treatment of Ores for the Production of Metals; and I do hereby declare that the following is a full, clear, and exact description of the same.

My invention relates to the treatment and reduction of metallic ores, by which is obtained a direct production of metals without the use of the ordinary blast-furnace. By this treatment iron ores, both oxides and carbonates, are converted into wrought-iron or cast-iron, or into steel of any required grade.

My invention consists, essentially, in the application, in measured and automatically-regulated quantities, of hydrogen, nitrogen, and carbonic oxide and acid gases and air with hydrocarbon vapors and gases, either with or without steam, to metallic ores of any kind or description in closed muffles, retorts, or chambers from which outside air and the products of combustion are excluded; and, also, to the treatment of such ores in open hearths, in cupolas, and in reverberatory furnaces for the separate steps required in the treatment of the respective ores and metals.

Heretofore attempts have been made to reduce ores to sponge by means of hydrocarbon liquid by introducing the liquid directly into the retort, muffle, or chamber which contains the ore to be reduced. By such methods of applying the hydrocarbon, which were without suitable regulation, irregular results were produced, materials were wasted, and the apparatus was liable to obstructions. Heavy hydrocarbon vapor and steam have also been used in the same unsystematic manner, with the same unsatisfactory results and waste of material.

I now proceed to describe my invention in its application to the treatment and reduction of iron ores, both oxides and carbonates.

In the reduction of oxide of iron ore these two steps are necessary: first, that the ore should be deprived of its oxygen and impurities, and, second, that a sufficient and determined amount of carbon should be supplied to produce a given quality of iron or steel.

In carrying out my invention for the reduction of oxide of iron ore I use any suitable muffle, retort, or chamber made of baked fire-clay or other suitable material, and closed to the outside air and to the products of combustion, being heated from without, into which I introduce the ore, ordinarily in its natural condition, or after being roasted, or after exposure to atmospheric influences, if the impure condition of the ore should require such preparatory treatment. To this muffle, retort, or chamber I lead pipes from any suitable source, supplying vapor, gases, air, and steam by means of automatic regulating and forcing devices, and from such muffle I permit the gaseous and vapor products to escape through suitable pipes to points of storage or consumption, to be used directly for heating or for other purposes. In this connection I may use, and prefer to use, the forcing and regulating apparatus shown in applications filed by me in the United States Patent Office June 29, 1883, marked "Division A," and July 9, 1883, "Division B," and July 9, 1883, "Division C;" or I may use the regulating and forcing devices shown in United States Patents Nos. 179,475, 182,456, 182,457, 241,208, 275,634, 275,635, 275,636, and 275,761, by means of which given proportionate quantities of vapors, gases, steam, or air may be varied at will and continuously supplied to the muffle or retort under an automatically-regulated pressure. In this apparatus I use steam produced by any ordinary boiler having a regulated pressure. I also lead into the muffle pipes from gas-holders, or from generators for the introduction of gases and vapors. The apparatus has not been shown, for the reason that it may be of any ordinary or well-known form.

The ore having been introduced into the muffle or chamber and brought to a cherry-red heat, I introduce hydrogen gas, or its equivalent hydrogen and carbonic oxide, or nitrogen and carbonic-oxide gases, from a holder or other source under a regulated supply, for the purpose of deoxidizing the ore by the union of the hydrogen with the oxygen of the ore, forming a watery vapor which passes off, and for the removal of impurities—such as sulphur, phosphorus, silica, &c.—and for the sponging of the ore. Having shut off the hydrogen gas when it has been sufficiently supplied, I pass superheated steam under an automatically-regulated supply, apparatus for which is shown in United States Patents Nos. 275,634 and 275,636, and as in application for United States Patent filed by me June 29, 1883, marked "Division A," into a heated dry vaporizer, preferably such as those shown in my applications for United States Patent filed June and July, 1883, marked Divisions "A," "B," and "C," to which a regulated and definite quantity of hydrocarbon liquid, which may be any mineral, vegetable, animal, or fish oil, is supplied, and the commingled steam and vapor is conveyed into the retort or chamber containing the ore, and by the combination of the carbon with the iron the sponge is fully prepared for subsequent treatment. If required, a mild steel may be produced by this subsequent treatment, or a more highly carbureted steel, which may be conveyed to crucibles and formed into cast-steel; or a still more highly carbureted iron may be produced, which may be melted in cupolas and poured into molds for castings. These different degrees of the carbonization of the metal are produced by the different quantities of the carbon which have been determined upon and permitted to enter in combination with the metal. The quantity of carbon in the gas, vapor, or liquid used is known by analysis, and the quantity required for use is automatically supplied by means of the regulating and forcing devices hereinbefore referred to. As the steam, being composed in part of oxygen, introduces that element into the retort which is already in combination with the iron, and which it is necessary to remove, it is so far objectionable as a carrier of the hydrocarbon vapor and causes a loss of the vapor by the union of its carbon with the oxygen of the steam. I therefore preferably use as a rarefier and carrier of the vapor, instead of the steam, hydrogen gas, which I heat and pass through the vaporizer. The commingled hydrogen gas and vapor is then conveyed to the muffle. The hydrogen both acts as a deoxidizing agent and facilitates the combination of the carbon with the iron; or I may use the hydrogen commingled with carbonic oxide and with the hydrocarbon vapor with similar results. The carbon of the carbonic oxide combining with the iron may assist in carbonizing it, the resulting carbonic-acid gas passing off without any injurious effect; or I may use nitrogen gas or nitrogen and carbonic-oxide gases commingled with the hydrocarbon vapor with a like result, the nitrogen giving a penetrating-power to the carbon in its combination with the iron; or in lieu of the above I may use commingled hydrogen and nitrogen gases with the hydrocarbon vapor, thus obtaining the benefits of both the hydrogen and nitrogen. In obtaining these results a formula such as the following may be used: One hundred pounds of pure sesquioxide of iron ($Fe_2O_3$) requires about seven hundred cubic feet of hydrogen to reduce it to iron, which requires about two and a half or three pints of petroleum product having a formula $C_7H_{16}$ to produce the metallic steel sponge claimed. Thus one hundred pounds of sesquioxide will produce about seventy-two pounds of the sponge. The time of treatment will vary from three to four hours. The quantity of material used and the time of treatment will vary with the character and condition of the ore treated. I also use, in lieu of the above, carbonic-oxide gas and hydrocarbon vapor with like results, the carbonic oxide serving to carry and rarefy the vapor in the same manner as the superheated steam and other agents named above, one of the purposes of this treatment being to obtain a light gaseous vapor of uniform quality, which I am able to secure by means of the automatic regulating apparatus, and which consequently produces uniform results. I also use the fixed air gas described in my application for United States Patent filed June 29, 1883, and in United States Patent No. 275,761, which, being composed of nitrogen, carbonic oxide, carbureted-hydrogen gas, and hydrocarbon vapor, acts in a manner entirely similar to the agents hereinbefore mentioned. In lieu of the commingled gases and hydrocarbon vapors, I also use carbureted-hydrogen gas with the production of similar results. The same process, when the hydrogen is used, is applicable with the same effect to all carbonate ores of iron. The carbonized iron or steel sponge produced by this treatment has imparted to it a portion of the non-corrodible element generic to my method of treating ores and metals, and the product, whether it be crystals of highly-carbonized steel, or of a steel or iron product of a lower grade of carbonization, has the property of remaining unchanged in condition in commercial usage from any oxidizing effects of the atmosphere or moisture.

All the agents employed I use in definite and proportionate quantities, according to the character of the product desired, preferably by means of the automatic regulating and forcing devices hereinbefore set forth.

When the iron sponge obtained in the manner hereinbefore described contains but a small percentage of carbon, it may, if desired, be transferred while in a heated state in an atmosphere of nitrogen, to protect it from oxidation, to a puddling-furnace for the purpose of being further treated for conversion into a malleable or wrought iron; or it may be allowed to cool in an atmosphere of nitrogen, and transferred when cold. When the sponge is transferred in a heated condition to a puddling-furnace, the two furnaces should be connected by a passage-way through which the sponge is transferred without exposure to the atmosphere, said passage-way being capable of being closed when the operation in either or both furnaces is being conducted.

I have described the process carried on in a closed muffle or chamber heated from without;

but obviously the same process may be carried on in furnaces heated by radiation from within—for example, in the form of furnace shown in Fig. 3, Plate 1, (Q,) in my Patent No. 182,457, of 1876. In this case the gases pass up into and through the ore, while the products of combustion pass over it without effect, otherwise than heating. It will be understood that the furnace need not be open to the atmosphere, the air being supplied in definite quantities and as consumed. It may therefore become an article of commerce, being produced at or near the mines, or at any convenient place, and transported or stored without deterioration. It may be distinguished by its partially-crystalline structure, by its brilliant surfaces, and by its quality of resisting the corrosive effects of the atmosphere or moisture.

I am aware that both liquid and vaporous hydrocarbons have been introduced into heated ores, in connection with steam, in unregulated quantities, and I do not broadly claim that method of treatment. I limit my claim to the application of the deoxidizing and decarbureting and carbureting agents in rarefied condition and in regulated quantities.

Having thus described my invention, I claim—

1. The process of treating iron ore, consisting in applying hydrogen gas and thin hydrocarbon vapor, or their equivalents, in regulated quantities, to the ores heated to a cherry red in a muffle or furnace, in the manner and for the purpose specified.

2. The described article of metallic sponge, produced substantially in the manner set forth, having a partially-crystalline structure, brilliant surfaces, and a practically non-corrodible quality throughout its structure, by which it is able to resist exposure to atmosphere or moisture without corrosion, substantially as described.

In testimony whereof I have signed my name to this specification in the presence of two subscribing witnesses.

JOSEPH PEARSON GILL.

Witnesses:
W. H. GRENELLE,
F. L. MIDDLETON.